(12) United States Patent
Werth et al.

(10) Patent No.: US 6,816,630 B1
(45) Date of Patent: Nov. 9, 2004

(54) SYSTEM AND METHOD FOR CREATING AND PROCESSING DATA FORMS

(75) Inventors: Larry J. Werth, Eagan, MN (US); Richard W. McGuire, Circle Pines, MN (US)

(73) Assignee: Electro-Sensors, Inc., Minneapolis, MN (US)

( * ) Notice: Subject to any disclaimer, the term of this patent is extended or adjusted under 35 U.S.C. 154(b) by 0 days.

(21) Appl. No.: 09/575,815

(22) Filed: May 22, 2000

(51) Int. Cl.[7] ............................................... G06T 11/00
(52) U.S. Cl. ..................... 382/287; 382/317; 715/506
(58) Field of Search ................................. 382/100, 112, 382/287, 317; 715/505, 506, 520, 541, 908; 283/36, 37

(56) References Cited

U.S. PATENT DOCUMENTS

| | | | | |
|---|---|---|---|---|
| 4,933,979 A | * | 6/1990 | Suzuki et al. ................. | 382/61 |
| 5,544,045 A | * | 8/1996 | Garland et al. ........ | 364/419.03 |
| 5,748,809 A | * | 5/1998 | Hirsch ......................... | 382/317 |
| 5,859,935 A | * | 1/1999 | Johnson et al. ............. | 382/317 |
| 5,887,088 A | * | 3/1999 | Kurokawa et al. .......... | 382/317 |

* cited by examiner

Primary Examiner—Andrew W. Johns
(74) Attorney, Agent, or Firm—Leffert Jay & Polglaze, P.A.

(57) ABSTRACT

A system allows a user to create and process data forms using familiar word processing and data base computer programs. The invention allows for form creation without interfacing with custom form software, but instead uses a known word processing program interface. The user, therefore, can be more efficient and has the tools provided with the word processing program. The present system can extract data from completed forms. This is performed through a scanning operation and a template. The extracted data can then be placed in a commercially available database program for processing.

16 Claims, 4 Drawing Sheets

Demonstration Form

Please Print as shown below. Stay within the boxes. Use CAPITAL letters only.

A B C D E F G H I J K L M N O P Q R S T U V W X Y Z 0 1 2 3 4 5 6 7 8 9

NAME

COMPANY NAME

AREA CODE  TELEPHONE NUMBER

DATE OF VISIT
MONTH  DAY  YEAR

AREA CODE  FAX NUMBER

LUNCH TAB

SAMPLE 0-9

Which of the following hardware do you use?
- ☐ IBM PB2
- ☐ 386 Based PC
- ☐ 486 Based PC
- ☐ Macintosh
- ☐ DEC
- ☐ NEXT
- ☐ Sun Sparcstation
- ☐ Other Your Gender?
- ☐ Male
- ☐ Female Which color do you prefer? (choose 1)
- ☐ Yellow
- ☐ Blue
- ☐ Red
- ☐ Green Signature _____  Date _____

*Fig. 2*

SYSTEM AND METHOD FOR CREATING AND PROCESSING DATA FORMS

TECHNICAL FIELD OF THE INVENTION

The present invention relates generally to computer systems and in particular the present invention relates to creating data forms using a computer system.

BACKGROUND OF THE INVENTION

Forms are commonly used to acquire information from individuals. The forms typically include locations for data entry, such as a person's name, age, address and other personal information. These forms can also be used to conduct surveys or perform tests. In general, paper forms can be used for collecting a plethora of information from individuals.

Creating custom forms can be done manually or using a special computer software program that runs on a general purpose computer. The software program is typically a stand alone product that allows a user to define different types of data entry fields to be included in the form. The software is then used to print the custom form. After the forms have been filled out by individuals, the completed forms can be scanned using an image (optical) scanning device. The data is then extracted from the scanned image by the software and the data exported to a database. While this approach works well, the need for custom software to create the forms results in some inefficiencies. Specifically, the software typically has a user interface that is not readily familiar to a user. Further, the custom software may not have many features available in more widely used office and home software applications.

For the reasons stated above, and for other reasons stated below which will become apparent to those skilled in the art upon reading and understanding the present specification, there is a need in the art for a system and method of creating and using forms that is integrated with familiar software applications.

SUMMARY OF THE INVENTION

The above mentioned problems with creating and processing data forms and other problems are addressed by the present invention and will be understood by reading and studying the following specification.

In one embodiment, a method of generating a data input form using a computer system is provided. The method comprises using a word processing application executed on the computer system to create a form document, selecting one or more scannable input data fields, and inserting the selected scannable input data field into the form document. The method further comprises processing the form document to record a location of the inserted scannable input data field within the form document, and creating a form identification indicator and inserting the form identification indicator in the form document.

In another embodiment, a method of creating and processing a data input form using a computer system is provided. The method comprises creating a data input form, processing the form document, and processing a completed form document. Creating the data input form comprises using a word processing application executed on the computer system to create a form document, selecting a scannable input data field, and inserting the selected scannable input data field into the form document. Processing the form document comprises locating the scannable input data field inserted into the form document, identifying the scannable input data field, extracting properties associated with the scannable input data field, creating a template that contains the identification, location and properties of the scannable input data field, and creating a form identification indicator and inserting the form identification indicator in the form document. Finally, processing a completed form document comprises optically scanning the completed form document, reading the form identification indicator, accessing the template associated with the form identification indicator, creating a database or spreadsheet associated with the form identification indicator, and extracting data from the scannable input data field inserted into the form document and placing the data into the database or spreadsheet.

BRIEF DESCRIPTION OF THE DRAWINGS

FIG. 2 illustrates a sample form generated by the present invention;

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Terminology

Spreadsheet applications (sometimes referred to simply as spreadsheets) are computer programs that can be used to create and manipulate data spreadsheets electronically. In a spreadsheet application, each value sits in a cell. The relationships between cells are called formulas, and the names of the cells are called labels. There are a number of commercially available spreadsheet applications on the market, Lotus 1-2-3 and Excel being among the most popular. Lotus 1-2-3 is a spreadsheet program designed for IBM-compatible personal computers by Lotus Corporation in 1982. Lotus 1-2-3 was the first publicly available program to combine graphics, spreadsheet functions and data management (three functions, hence the name). Its relative ease of use and flexibility made it an enormous success and contributed to the acceptance of personal computers in business. Excel is a database program available from Microsoft Corp. of Redmond, Wash.

Word processing applications are computer programs that can be used to create and manipulate text, data and graphics. There are a number of commercially available word processing applications on the market, WORDPERFECT from Corel Corporation and WORD from Microsoft Corp. being among the most popular.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Figure 1:
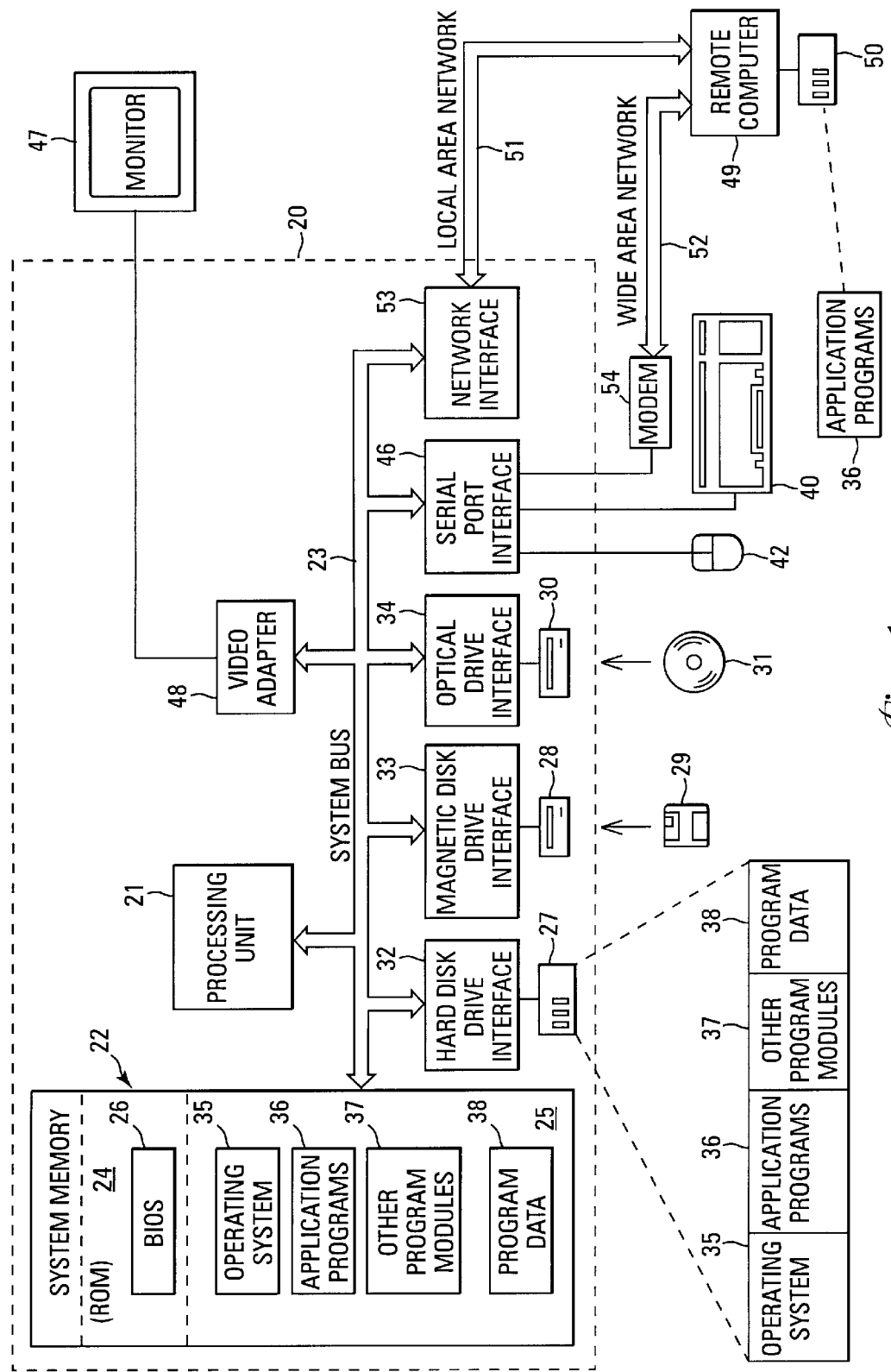
FIG. 1 is a diagram of a hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory, disc or CD. The computer may also include a communications device such as a network adapter or a modem, so that it is able to communicatively couple other computers.

Form Creation

As explained above, the requirement that forms be created while executing custom software is not desired. The present invention, therefore, provides a system where traditional word processing software is used to create custom forms. That is, traditional word processing software is modified to perform the functions necessary to create and edit custom forms. The present invention also interacts with traditional data base spreadsheets to extract data from completed forms and maintain data files in the spreadsheets. As will be appreciated by studying the present description, modifying widely used word processing applications to perform the task of creating custom scannable forms provides a new system and application that allows users to create forms while interacting with a user interface that is more familiar to the user. Further, features that are commonly included in word processing applications, such as spell checking, searching and grammar checking, and graphics can be used while creating custom forms. As explained in greater detail below, the present invention modifies word processing software with a form module to provide the features described herein. The forms can then be scanned after a user completes the form and data can be extracted from the scanned forms. The present invention then allows the data to be automatically entered into a spreadsheet application for data analysis.

Prior to describing the present system in greater detail, some features available in embodiments of a form are described. FIG. 2 illustrates a sample form 100 generated by the present invention. It is noted that the forms created with the present invention can be customized and the present invention is not limited to the illustration provided.

Figure 3:
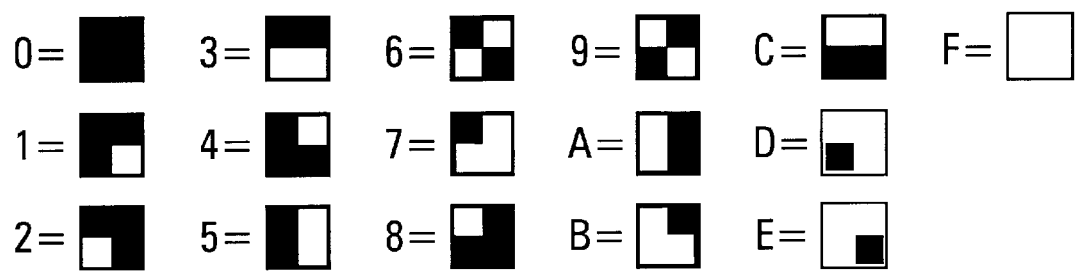
FIG. 3 illustrates one embodiment of hexadecimal locators.
Figure 4:
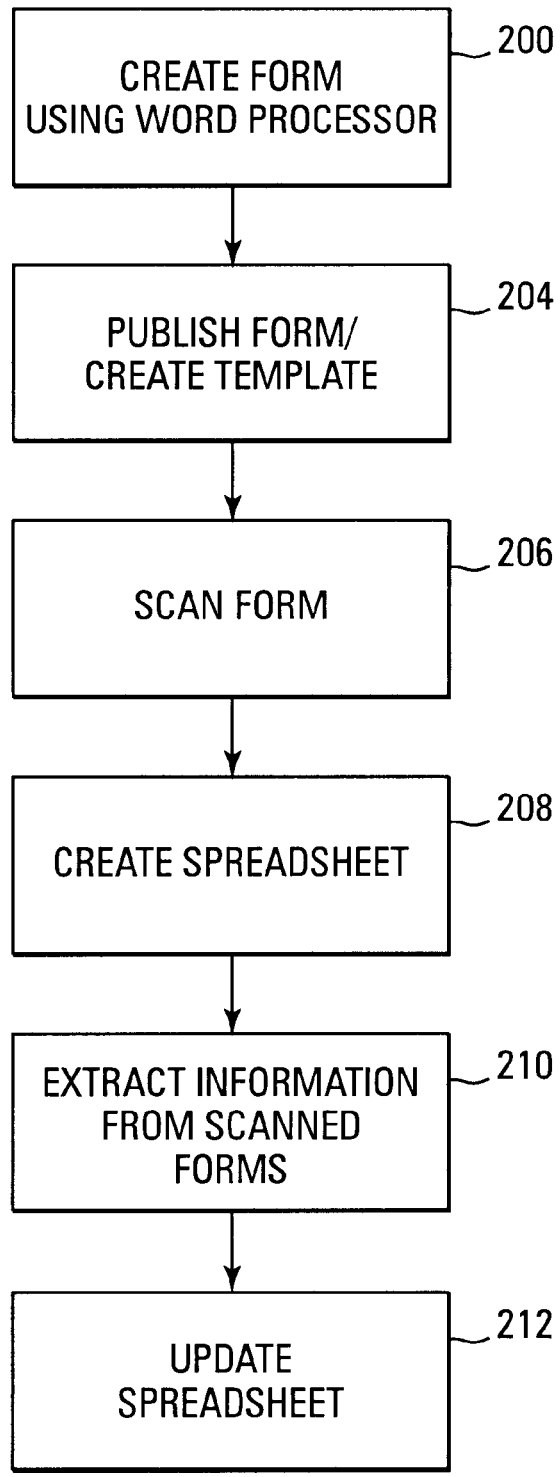
FIG. 4 is a flow chart of one embodiment of the present invention.

Orientation of a completed form during scanning is important. That is, it is important to have the image registered properly so that data can be accurately extracted. Locators, or registration marks, have been in prior custom software applications to provide location marks in four corner regions of a form. These locator marks can be merely registration marks, or they can be data marks, such as hexadecimal locators. Hexadecimal locators can be used to embed a form identifier onto the form. Thus, hexadecimal locators act both as a tool to identify a form and as locators for processing. In prior embodiments, 16 different hexadecimal characters have been provided, each representing a number or a letter. All sixteen of them and their corresponding numbers or letters, are shown in FIG. 3. The top two 104 and 106 and the bottom left 108 locator marks represent three characters used as a form identifier. The bottom right locator 110 represents a page number of the document. During processing, the form identifier is read from top to bottom, left to right, so the top left locator mark 106 is the first character of the name, the top right locator mark 104 is the second character, and the bottom left locator mark 108 is the last character of the name.

This system is limited to identifying a form with limited pages, 16 pages. That is, the single locator 110 in the bottom right corner of the form limits the number of pages to 16. The present invention provides two hexadecimal locator marks 110 and 112 at the bottom right region of a form. The new locator system provides two benefits over the prior system. First, a page count of a multi-page form can be increased to 256 pages by using marks 110 and 112 in combination. Second, the additional locator provides a tool for locating the top of a form. That is, in prior systems, if the form were scanned in up-side-down, data extraction would be erroneous. With the present system, incorrectly scanned forms can be correctly oriented after the scanned image is acquired. This allows incorrectly fed forms to be used and decreases the need for re-scanning.

The above described hexadecimal locators are one embodiment of the present invention. The fifth locator 112 can be provided anywhere on a form and is not limited to a lower right region. The locators can be any shape and are not limited to the illustrated square shape having four quadrant bits. Finally, the described locator orientation on a form for reading the identification and page numbers are not limited to the pattern described.

Different fields, or scannable objects, can be defined for use in a form. Some of these fields are described below with reference to FIG. 2. One of feature of the present invention is that it can recognize and read hand printed characters with great accuracy. A Hand Print Field 120 is a series of connected boxes into which users enter hand printed letters and numbers. For greater accuracy in processing, letters and numbers written into Hand Print Fields should be contained entirely within the boxes of the Field. None of the letters or numbers should touch the lines of the boxes. Characters printed in Hand Print Fields need to be printed neatly. The accuracy with which the Field is read depends on the quality of the handwriting. Straight lines must be clearly distinguishable from curved ones.

Given the above conditions, Hand Print Fields 120 are most appropriate for use in situations where the user is entering a name, telephone number, social security number, etc. For situations where the user will give a longer, freeform response, use of an Image Capture Field 160 is more appropriate. These Field types are described below.

Check Mark Fields 130 are available for inclusion in a form for questions that require a user to choose one or more options from a selection of possible responses. Check Mark Fields typically consist of check mark boxes which are labeled with text or assigned a value, numeric or otherwise. Some Check Mark Fields may require that one response (a single mark) be given. Others will allow more than one response (multiple marks).

Bar Code Fields 140 are also available for inclusion in a form, and are typically used to create another type of form identification. The use of bar codes, however, is not limited to form identification. A Bar Code Field can be placed anywhere it's needed on a form.

There may be portions of a form's text that are desired in a data file containing the processed form data. For example, a serial number off of the form may be desired, or information off of a preprinted mailing label or a warranty card. These areas can be defined so that text can be read using Optical Character Recognition (OCR) technology. Text which will be read for OCR is considered an OCR Field 150.

Some embodiments allow for the "capture" of images from a Image Capture Field 160, and save these images as a PCX, Windows bitmap, or a TIFF (Group 4) file. This feature is useful when an image of a form user's signature or a drawing such as a street diagram is desired. Further, this feature can be used to retain free-form hand printed comments in their original format.

The above described fields provide some basic building blocks for creating custom forms. The present invention includes a word processing application that has been modified to allow a user familiar with a basic wordprocessor application to create and edit a custom data form. The user then "publishes" the custom form. The term publish herein refers to an operation where the software records (creates a template) the locations of the fields or objects created. Further, the form identification and page numbers can be automatically generated and placed in the form using the hexadecimal locators. The location of the fields created are then used to create an extraction module, or template. The extraction module is used to extract data scanned from completed forms. That is, the image captured during scanning is partitioned into the data fields and the data is extracted.

A database spreadsheet can be created when a form is scanned. Scanning software, or form reader software, can be used to extract the data. The software uses the template created when the form was published to located desired fields. The form identification marks, and/or bar code indicates what template to use. The scanning software then updates a database spreadsheet with the extracted data.

In one embodiment, the present invention provides a software macro to extend the functionality of a word processor. Referring to FIG. 3, once all scannable objects have been placed within a word processing document at 200, the fonts are located and a form file (template) is created at 204. The fonts are used to create the scannable objects, described above. Thus, the X-Y location the objects and properties of the objects are used to create the template form file (.FRM). Again, the form file is used to extract data from a scanned form.

Current systems scan data from a form and store the date it into a proprietary database. The data is then processed and exported for access by commercial data base applications, such as an Access database or an Excel spread sheet. The present invention, in contrast, creates a spreadsheet at 208 in real time when data is scanned at 206. In addition, the present system extracts the data from the scanned form at 210 and writes the data into the spreadsheet directly at 212.

The scannable objects of the present invention are distinguishable over tables created in word processor applications. That is, the objects are created using fonts and properties that identify them as input fields. Each of the objects include properties about the object that can be set when the object is created (for example, field size and type). When a form is published, every object that was inserted on the form is located, identified, the properties are extracted and the template is created. Thus, the present invention does more than just simply creating a form that can be printed out.

During publishing, the form is assigned a unique identification, and the locators in the corner regions of the form are automatically changed to reflect this new identification. The identification is also registered with the database. When a completed form is scanned, form reader software knows where the form template is, accesses the template, and provides a user the option of placing the data into a database or spreadsheet. If a database or spreadsheet does not exits, the system can create one, and then the data is extracted from the form and placed into the database.

The present invention provides a tool for creating and using custom forms. The invention modifies commercially available and widely used word processing software so that a user can create the forms without interfacing with a custom form-only software. That is, while initial software instructions are used to modify the word processing software, the user does not interface with this software to create forms, but instead uses the word processing software. The invention can also provide a system to extract data and place the extracted data into a database spreadsheet for processing.

CONCLUSION

A system has been described that allows a user to create and process forms using familiar word processing and data base computer programs. The described invention allows for form creation without interfacing with custom form software, but instead uses a known word processing program interface. The user, therefore, can be more efficient and has the tools provided with the word processing program. The present system can extract data from completed forms. This is performed through a scanning operation and a template. The extracted data can then be placed in a commercially available database program for processing.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method of generating a data input form using a computer system, the method comprising:
   using a word processing application executed on the computer system to create a form document;
   selecting one or more scannable input data fields;
   inserting the selected scannable input data field into the form document;
   processing the form document to record a location of the inserted scannable input data field within the form document; and
   creating a hexadecimal form identification indicator and inserting the hexadecimal form identification indicator in the form document such that the indicator is also used as a locator.

2. The method of claim 1 wherein the one or more scannable input data fields is selected from the group comprising a Hand Print Field, a Check Mark Field, a Bar Code Field, an Optical Character Recognition field, and an Image Capture Field.

3. The method of claim 1 wherein the hexadecimal form identification indicator comprises five hexadecimal locators, wherein four of the hexadecimal locators are respectively located in four corner regions of the form document to provide registration marks for the form document, the fifth hexadecimal locator is located on the form document to indicate a top of the form document.

4. The method of claim 3 wherein three of the four hexadecimal locators provide an identification for the form document, and a remaining one of the four hexadecimal locators is used to identify a page number of a page of the form document.

5. The method of claim 4 wherein the fifth hexadecimal locator is used in combination with the remaining one of the four hexadecimal locators to identify a page number of a page of the form document.

6. The method of claim 1 wherein processing the form document further comprises:
- locating the scannable input data field inserted into the form document;
- identifying the scannable input data field;
- extracting properties associated with the scannable input data field; and
- creating a template that contains the identification, location and properties of the scannable input data field.

7. A method of creating and processing a data input form using a computer system, the method comprising:
- creating a data input form comprising,
  - using a word processing application executed on the computer system to create a form document,
  - selecting a scannable input data field, and
  - inserting the selected scannable input data field into the form document;
- processing the form document comprising,
  - locating the scannable input data field inserted into the form document,
  - identifying the scannable input data field,
  - extracting properties associated with the scannable input data field,
  - creating a template that contains the identification, location and properties of the scannable input data field, and
  - creating a hexadecimal form identification indicator and inserting the hexadecimal form identification indicator in the form document such that the indicator is also used as a locator; and
- processing a completed form document comprising,
  - optically scanning the completed form document,
  - reading the form identification indicator,
  - accessing the template associated with the form identification indicator,
  - creating a database or spreadsheet associated with the form identification indicator, and
  - extracting data from the scannable input data field inserted into the form document and placing the data into the database or spreadsheet.

8. The method of claim 7 wherein the one or more scannable input data fields is selected from the group comprising a Hand Print Field, a Check Mark Field, a Bar Code Field, an Optical Character Recognition field, and an Image Capture Field.

9. The method of claim 7 wherein the hexadecimal form identification indicator comprises five hexadecimal locators, wherein four of the hexadecimal locators are respectively located in four corner regions of the form document to provide registration marks for the form document, the fifth hexadecimal locator is located on the form document to indicate a top of the form document.

10. The method of claim 9 wherein three of the four hexadecimal locators provide an identification for the form document, and a remaining one of the four hexadecimal locators is used to identify a page number of a page of the form document.

11. The method of claim 10 wherein the fifth hexadecimal locator is used in combination with the remaining one of the four hexadecimal locators to identify a page number of a page of the form document.

12. A form document comprising:
- one or more scannable input data objects, the scannable input data objects include a region for data entry by a form user; and
- a form identification indicator comprising five hexidecimal locators, wherein four of the hexidecimal locators are respectively located in four corner regions of the form document to provide registration marks for the form document, the fifth hexidecimal locator is located on the form document to indicate a top of the form document.

13. The form document of claim 12 wherein three of the four hexidecimal locators provide an identification number for the form document, and a remaining one of the four hexidecimal locators is used in combination with the fifth locator to identify a page number of a page of the form document.

14. The form document of claim 12 wherein the one or more scannable input data objects is selected from the group comprising a Hand Print object, a Check Mark object, an Optical Character Recognition object, and an Image Capture object.

15. A method of identifying a multi-page form comprising:
- locating first, second, and third identification marks respectively in first, second, and third corner regions of each page of the multi-page form, the first, second, and third identification marks each comprise an optical hexadecimal mark such that the first, second, and third identification marks in combination for an identification number form the multi-page form; and
- locating fourth and fifth identification marks in a fourth corner region of each page of the multi-page form, the fourth and fifth identification marks each comprise an optical hexadecimal mark such that the fourth and fifth identification marks in combination form a page number for each page of the multi-page form, the fifth identification mark further indicates either a top or bottom of each page of the multi-page form.

16. The method of claim 15 wherein the first, second, third, fourth and fifth identification marks are each square shaped with four quadrant bits.

* * * * *